US012650856B2

(12) United States Patent　　　　　(10) Patent No.: US 12,650,856 B2
Zou et al.　　　　　　　　　　　　　(45) Date of Patent: Jun. 9, 2026

(54) JAVA BYTECODE INJECTION METHODS AND APPARATUSES, ELECTRONIC DEVICES, AND STORAGE MEDIA

(71) Applicant: Alipay (Hangzhou) Information Technology Co., Ltd., Hangzhou (CN)

(72) Inventors: Zijing Zou, Hangzhou (CN); Qier Lu, Hangzhou (CN); Jiaqing Zheng, Hangzhou (CN); Hengmao Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 417 days.

(21) Appl. No.: 18/491,535

(22) Filed: Oct. 20, 2023

(65) Prior Publication Data

US 2024/0134659 A1　　Apr. 25, 2024
US 2024/0231847 A9　　Jul. 11, 2024

(30) Foreign Application Priority Data

Oct. 20, 2022　(CN) .......................... 202211289274.8

(51) Int. Cl.
*G06F 9/445*　　　(2018.01)
*G06F 9/455*　　　(2018.01)
(52) U.S. Cl.
CPC ...... *G06F 9/44521* (2013.01); *G06F 9/45504* (2013.01)
(58) Field of Classification Search
CPC .. G06F 9/44521; G06F 9/45504; Y02D 10/00
See application file for complete search history.

(56) References Cited

U.S. PATENT DOCUMENTS 12,050,668 B1 * 7/2024 Soofi ........................ G06F 21/14
2024/0012742 A1 * 1/2024 Mun ................... G06F 11/3644

FOREIGN PATENT DOCUMENTS

CN　　104657258 A　　5/2015
CN　　111290760 A　　6/2020
(Continued)

OTHER PUBLICATIONS github.com [online], "JVM-SANDBOX," retrieved on Feb. 11, 2025, retrieved from URL<https://github.com/alibaba/jvm-sandbox/blob/master/doc/JVM-SANDBOX-ReadMe-English.md>, 3 pages.
(Continued)

*Primary Examiner* — Sisley N Kim
(74) *Attorney, Agent, or Firm* — Fish & Richardson P.C.

(57)　　　　　ABSTRACT

This specification provide example Java bytecode injection methods, apparatuses and machine-readable storage media, which can be applied to a Javaagent framework deployed in a Java virtual machine. In an example, a to-be-injected Java bytecode submitted by a target service module in at least one service module is obtained, and a target implementation class corresponding to the to-be-injected Java bytecode is determined. A target injection point type corresponding to the target implementation class is determined, and the target injection point type is respectively matched with mapping relationships maintained in the Java virtual machine to determine a target injection mode corresponding to the target injection point type. A globally unique class transformer is invoked so that the class transformer injects, based on the target injection mode, the Java bytecode into a class file that corresponds to the target service module and that is to be loaded by the Java virtual machine.

20 Claims, 6 Drawing Sheets

(56)         References Cited

FOREIGN PATENT DOCUMENTS

CN          114327772  A      4/2022
WO      WO 2015074526  A1      5/2015

OTHER PUBLICATIONS byteman.jboss.org [online], "Welcome to Byteman," retrieved on
Feb. 11, 2025, retrieved from URL<https://byteman.jboss.org>, 6
pages.

* cited by examiner

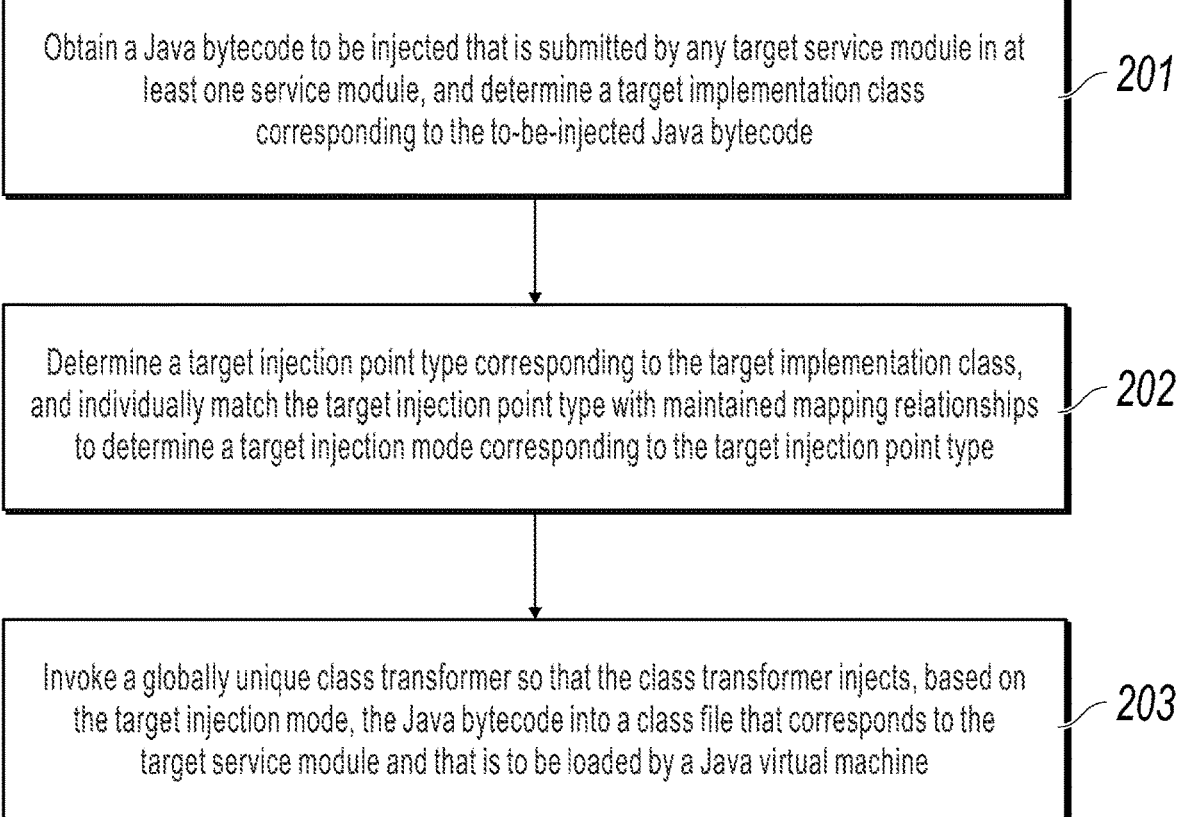

Obtain a Java bytecode to be injected that is submitted by any target service module in at least one service module, and determine a target implementation class corresponding to the to-be-injected Java bytecode — 201

Determine a target injection point type corresponding to the target implementation class, and individually match the target injection point type with maintained mapping relationships to determine a target injection mode corresponding to the target injection point type — 202

Invoke a globally unique class transformer so that the class transformer injects, based on the target injection mode, the Java bytecode into a class file that corresponds to the target service module and that is to be loaded by a Java virtual machine — 203

FIG. 2

JAVA BYTECODE INJECTION METHODS AND APPARATUSES, ELECTRONIC DEVICES, AND STORAGE MEDIA

CROSS-REFERENCE TO RELATED APPLICATIONS

This application claims priority to Chinese Patent Application No. 202211289274.8, filed on Oct. 20, 2022, which is hereby incorporated by reference in its entirety.

TECHNICAL FIELD

This specification relates to the field of computer technologies, and in particular, to Java bytecode injection methods and apparatuses, electronic devices, and storage media.

BACKGROUND

In Java, codes that can be understood by a Java virtual machine (JVM) are referred to as bytecodes, and the bytecodes are oriented to only virtual machines instead of any specific processor. Java alleviates the problem of inefficient execution of conventional interpretive languages to some extent by way of bytecodes, while retaining a characteristic of transplantability of the interpretive languages. Since bytecodes are not intended for a particular machine, Java programs can run on computers of multiple different operating systems without being recompiled.

Javaagent loaded by a JVM upon startup is a new feature introduced by a Java software development kit, and is also referred to as bytecode enhancement. Javaagent's mechanism allows a user to perform interception before a JVM loads bytecodes, so as to first load an agent file compiled by the user, and implement injection of self-defined codes by modifying the bytecodes. Constructing an agent program independent of an application program by using an agent technology allows for monitoring and assisting a program running on a JVM, and even dynamically replacing and modifying definitions of certain classes. For example, JVM status monitoring, fault locating, etc. can be performed in real time by using the agent technology.

However, when multiple injection agents perform multiple injections on the same class, multiple bytecode modifications are needed. Because the modifications are cumulative, the multiple modifications increase unpredictability, which is easily prone to uncertainty of program behaviors.

SUMMARY

In view of this, one or more embodiments of this specification provide Java bytecode injection methods and apparatuses, electronic devices, and storage media to alleviate a problem in a related technology.

To achieve the above-mentioned objective, one or more embodiments of this specification provide the following technical solutions:

According to a first aspect of the embodiments of this specification, a Java bytecode injection method is provided, and is applied to a Javaagent framework deployed in a Java virtual machine. The Javaagent framework is connected to at least one service module that has a code injection need. A globally unique class transformer is registered with the Java virtual machine, and the Java virtual machine further maintains mapping relationships between injection point types and injection modes that correspond to implementation classes included in the at least one service module. The method includes the following: a to-be-injected Java bytecode that is submitted by any target service module in the at least one service module is obtained, and a target implementation class corresponding to the to-be-injected Java bytecode is determined; a target injection point type corresponding to the target implementation class is determined, and the target injection point type is individually matched with the maintained mapping relationships to determine a target injection mode corresponding to the target injection point type; and the globally unique class transformer is invoked so that the class transformer injects, based on the target injection mode, the Java bytecode into a class file that corresponds to the target service module and that is to be loaded by the Java virtual machine.

According to a second aspect of the embodiments of this specification, a Java bytecode injection apparatus is provided, and is applied to a Javaagent framework deployed in a Java virtual machine. The Javaagent framework is connected to at least one service module that has a code injection need. A globally unique class transformer is registered with the Java virtual machine, and the Java virtual machine further maintains mapping relationships between injection point types and injection modes that correspond to implementation classes included in the at least one service module. The apparatus includes the following: an acquisition module, configured to obtain a to-be-injected Java bytecode that is submitted by any target service module in the at least one service module, and determine a target implementation class corresponding to the to-be-injected Java bytecode; a matching module, configured to determine a target injection point type corresponding to the target implementation class, and individually match the target injection point type with the maintained mapping relationships to determine a target injection mode corresponding to the target injection point type; and an injection module, configured to invoke the globally unique class transformer so that the class transformer injects, based on the target injection mode, the Java bytecode into a class file that corresponds to the target service module and that is to be loaded by the Java virtual machine.

According to a third aspect of the embodiments of this specification, an electronic device is provided, including a communications interface, a processor, a memory, and a bus. The communications interface, the processor, and the memory are connected to each other by using the bus; and the memory stores a machine-readable instruction, and the processor performs the above-mentioned method by invoking the machine-readable instruction.

According to a fourth aspect of the embodiments of this specification, a machine-readable storage medium is provided. The machine-readable storage medium stores a machine-readable instruction. When invoked and executed by a processor, the machine-readable instruction implements the above-mentioned method.

The technical solutions provided in the embodiments of this specification can include the following beneficial effects:

According to the above-mentioned technical solutions, the globally unique class transformer is constructed, and mapping relationships between injection point types and injection modes that correspond to implementation classes included in a service module are constructed. When a bytecode submitted by the service module is to be injected, an injection mode can be determined based on the mapping relationships. Such practice avoids creating a new class transformer each time a bytecode is injected, and there is no need to match or weave multiple class transformers, thereby shortening a time consumed by class transformation and improving matching efficiency of class transformation.

BRIEF DESCRIPTION OF DRAWINGS

FIG. 2 is a flowchart illustrating a Java bytecode injection method, according to some example embodiments of this specification;

DESCRIPTION OF EMBODIMENTS

Figure 1:
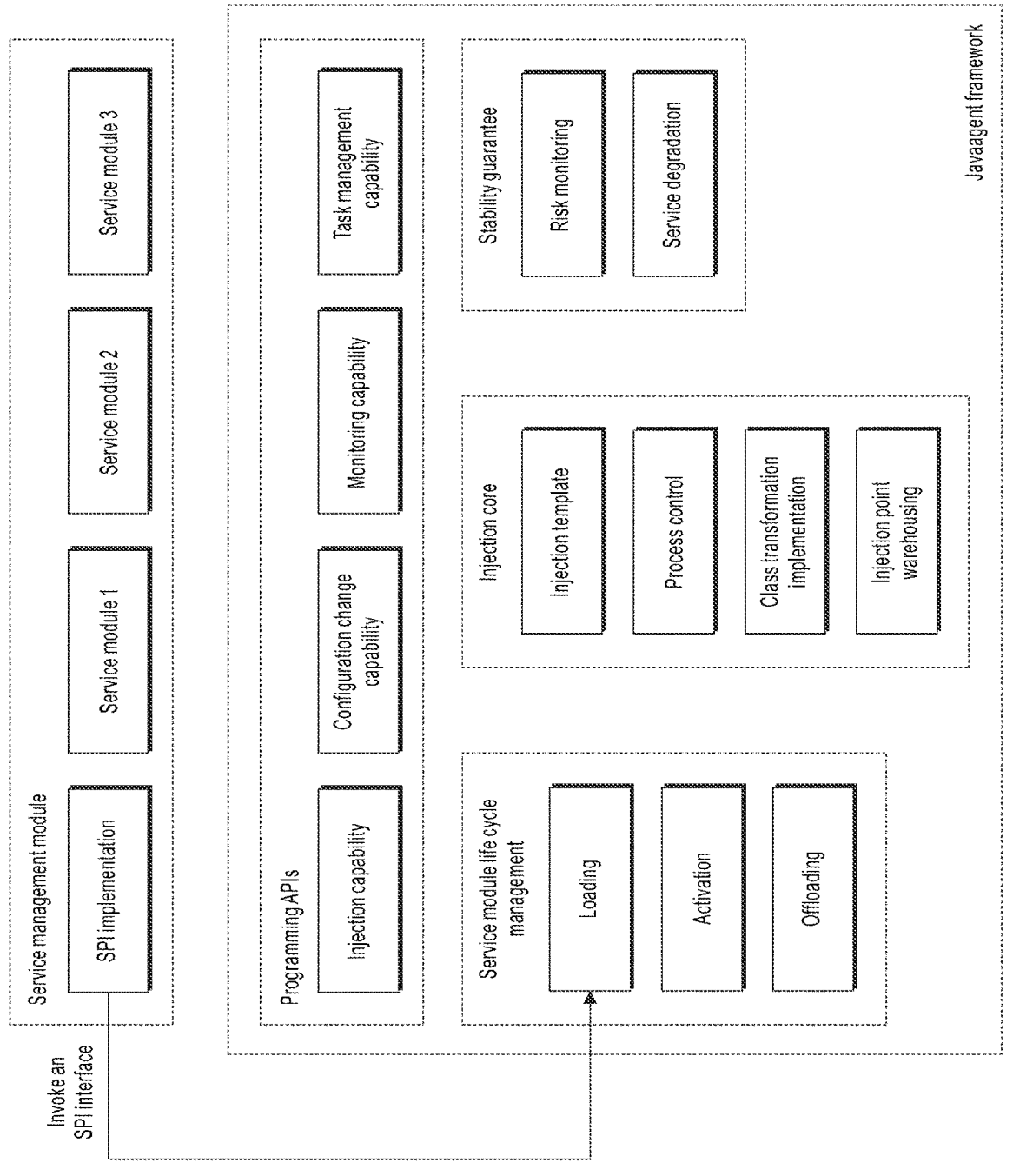
FIG. 1 is a schematic diagram illustrating a Javaagent framework, according to some example embodiments of this specification.

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of this specification, but merely examples of apparatuses and methods that are consistent with some aspects of one or more embodiments of this specification, as described in detail in the appended claims.

It is worthwhile to note that, in another embodiment, steps of a corresponding method are not necessarily performed based on a sequence shown and described in this specification. In some other embodiments, the method thereof can include more or fewer steps than the steps described in this specification. In addition, a single step described in this specification may be broken down into multiple steps for description in another embodiment. However, multiple steps described in this specification may also be combined into a single step for description in another embodiment.

Currently, Javaagent can monitor and analyze various aspects of a JVM and even interfere with JVM running. Therefore, regardless of whether the JVM is in an online environment or an offline environment, there are many bytecode injection scenarios for Java applications.

For example, a bytecode injection agent in an offline environment includes a coverage rate collection agent, a precision test agent, a basic security agent, etc.; and a bytecode injection agent in an online environment includes a technical blue-attack component, several dynamic program behavior analysis components, a test regression agent, etc.

However, the multiple bytecode injection scenarios are not constructed based on a unified standard, and underlying injection frameworks are not unified, either. Some frameworks are self-developed for a Java bytecode operation and analysis framework, and some are open-source bytecode frameworks, such as sandbox and byteman. Although these frameworks all can provide a comprehensive programming software development kit, module life cycle management, an injection template capability, etc. and can address service needs dependent on bytecode scenarios to a certain extent, these frameworks still have some disadvantages when used in a wide range of production environments.

Java supports setting of multiple class transformers (i.e., ClassFileTransformer) in a class loading phase. The class transformers can implement bytecode injection before a class is loaded into a JVM. For each injection point, one class transformer is created to implement class transformation. Because the multiple class transformers employ a chain structure to achieve a purpose of class re-weaving, chained matching and weaving need to be performed during class transformation, and whether transformation needs to be performed needs to be determined by executing the class transformers one by one, i.e., weaving is performed multiple times for one injection point.

When an injection point is specific to a superclass or an interface, structural parsing usually needs to be performed to carry out class transformation. Therefore, during use in a wide range of production environments, parsing for multiple injection points consumes an excessively long time for bytecode modification. As a result, a time for a startup phase of an application process is increased, application startup is affected, and emergency effectiveness is affected when a fault occurs.

In view of this, this specification discloses the following technical solutions: A target injection point type is first determined based on a target implementation class corresponding to a bytecode submitted by a target service module, and then a corresponding target injection mode is determined by matching a mapping relationship, so that a globally unique class transformer performs injection based on the target injection mode, thereby breaking the above-mentioned case of repeated injection, reducing dependence of a service scenario on a weaving capability for bytecodes, and reducing a time consumed by class transformation.

During implementation, a to-be-injected Java bytecode is obtained, where the Java bytecode is submitted by any target service module in at least one service module that is connected to a Javaagent framework and that has a code injection need, and a target implementation class corresponding to the to-be-injected Java bytecode is determined.

For example, at least one service module can be obtained by invoking an SPI interface, and the obtained service module can be loaded into the Javaagent framework to complete connection of the at least one service module. Then, a to-be-injected Java bytecode that is submitted by any target service module in the connected service module can be obtained to determine a target implementation class corresponding to the to-be-injected Java bytecode.

Subsequently, a target injection point type corresponding to the target implementation class can be determined, and the target injection point type is matched with mapping relationships maintained by a Java virtual machine between injection point types and injection modes that correspond to implementation classes included in the at least one service module, so as to determine a target injection mode corresponding to the target injection point type.

For example, structural parsing can be performed on the target implementation class, and a target injection point type corresponding to the target implementation class can be determined based on a parsing result, and the target injection point type is matched with mapping relationships maintained by a Java virtual machine between injection point types and injection modes that correspond to implementation classes included in the at least one service module, so as to determine a target injection mode corresponding to the target injection point type.

Afterwards, the globally unique class transformer registered with the Java virtual machine can be invoked, so that the class transformer injects, based on the target injection mode, the Java bytecode into a class file that corresponds to the target service module and that is to be loaded by the Java virtual machine.

For example, the globally unique class transformer registered with the Java virtual machine can be invoked, so that the class transformer injects the Java bytecode based on the target injection mode. Assume that the target injection mode is precise injection that a code is injected for the implementation class based on class name information corresponding to the implementation class. In this case, based on class name information of the target implementation class, it is determined whether the class file that corresponds to the target service module and that is to be loaded by the Java virtual machine is a class file adaptive to the target implementation class. In response to that the class file that corresponds to the target service module and that is to be loaded by the Java virtual machine is a class file adaptive to the target implementation class, the Java bytecode is injected into the class file.

According to the above-mentioned technical solutions, a globally unique class transformer is constructed, and mapping relationships between injection point types and injection modes that correspond to implementation classes included in a service module are constructed. When a bytecode submitted by the service module is to be injected, an injection mode can be determined based on the mapping relationships. Such practice avoids creating a new class transformer each time a bytecode is injected, and there is no need to match or weave multiple class transformers, thereby shortening a time consumed by class transformation and improving matching efficiency of class transformation.

The following describes the Javaagent framework of this specification in detail with reference to the accompanying drawings.

FIG. 1 is a schematic diagram illustrating a Javaagent framework, according to some example embodiments of this specification. As shown in FIG. 1, the Javaagent framework can include four parts: programming APIs, service module life cycle management, an injection core, and stability guarantee.

The above-mentioned programming application programming interfaces (APIs) are some predefined functions, which are intended to provide application programs and developers with capabilities for accessing a group of routines based on certain software or hardware. Based on the programming APIs, the Javaagent framework provides a set of standard basic capabilities for different service modules that need to be connected. For example, the standard basic capabilities include an injection capability, a configuration change capability, a monitoring capability, a task management capability, etc.

The above-mentioned service module life cycle management allows for discovering, by way of a service provider interface (SPI), a service module that needs to be connected, and defines a set of service module life cycle management methods including loading, activation, and offloading.

The above-mentioned injection core includes an injection template, process control, class transformation implementation, and injection point warehousing. An injection timing can be determined by using the injection template. For example, injection is performed before method execution, injection is performed after a result is returned during method running, or injection is performed when an abnormality occurs during method execution. Process control can be used to determine a process control statement in an injection process, such as null processing, immediate return, throw exception, etc. Class transformation implementation can be used to manage the globally unique class transformer and construct a matcher group. The injection point warehousing can be used to store injection points, record injection events, manage the events, etc.

The above-mentioned stability guarantee includes risk monitoring and service degradation. Risk monitoring can be used to perform data collection on various monitoring indicator data, and report the monitoring indicator data in a form of logs. Further, whether service degradation processing needs to be performed can be determined by using the logs. When service degradation processing needs to be performed, a service degradation portion can perform corresponding degradation processing, and instruct operation and maintenance personnel to perform troubleshooting.

It is worthwhile to note that, Javaagent is essentially a tool used to implement a code injection function. The tool can be specifically in a form of a jar package, and the tool can be deployed in a JVM by loading the jar package into a specified process in the JVM.

With reference to FIG. 1 and FIG. 2, the following describes in detail a Java bytecode injection method applied to the Javaagent framework in FIG. 1 in this specification.

FIG. 2 is a flowchart illustrating a Java bytecode injection method, according to some example embodiments of this specification. The method is applied to a Javaagent framework deployed in a Java virtual machine. As shown in FIG. 2, the method includes the following execution steps.

Step 201: Obtain a to-be-injected Java bytecode that is submitted by any target service module in the at least one service module, and determine a target implementation class corresponding to the to-be-injected Java bytecode.

Step 202: Determine a target injection point type corresponding to the target implementation class, and individually match the target injection point type with the maintained mapping relationships to determine a target injection mode corresponding to the target injection point type.

Step 203: Invoke the globally unique class transformer so that the class transformer injects, based on the target injection mode, the Java bytecode into a class file that corresponds to the target service module and that is to be loaded by the Java virtual machine.

Figure 3:
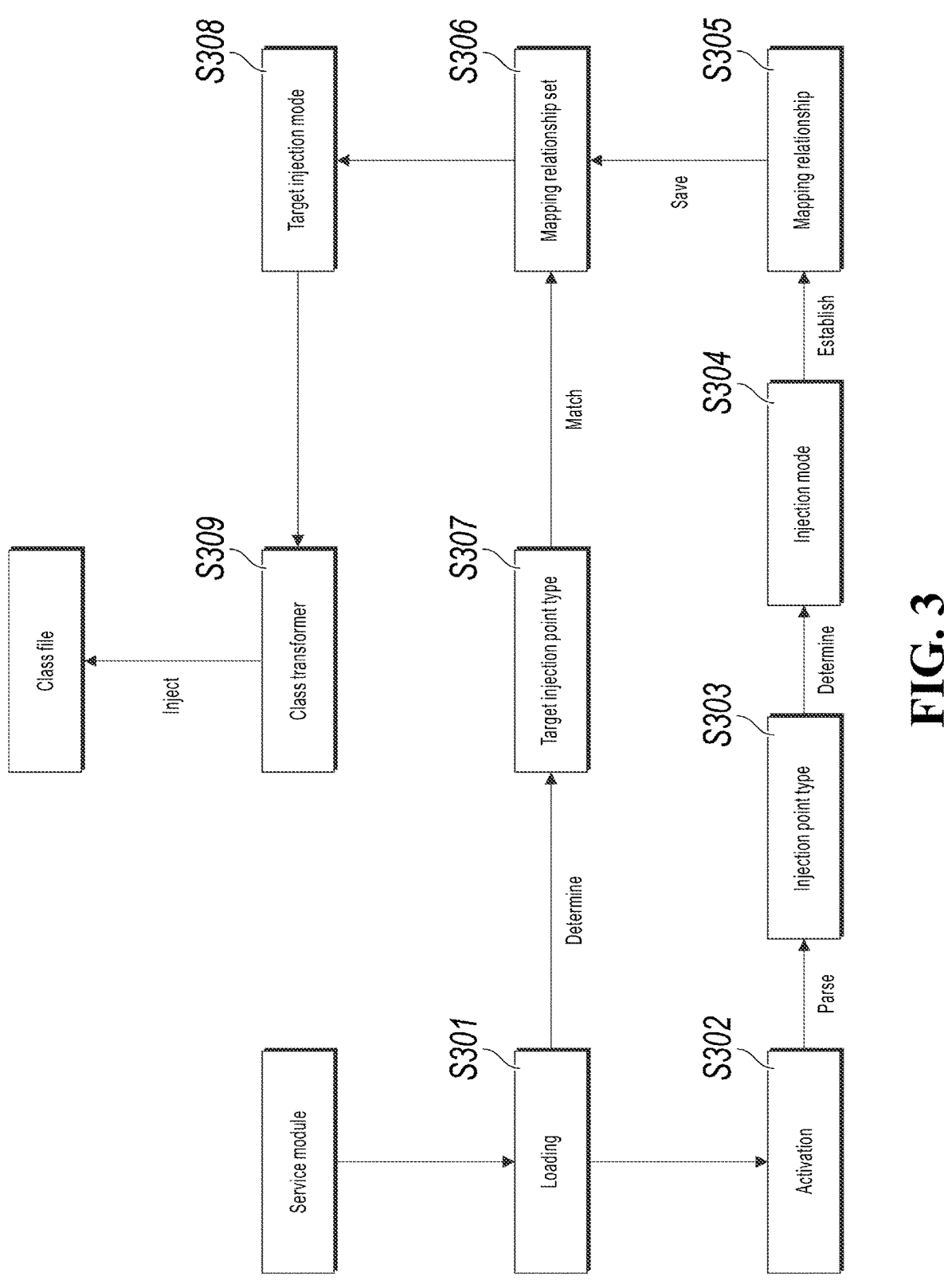
FIG. 3 is a schematic diagram illustrating a Java bytecode injection method, according to some example embodiments of this specification.

FIG. 3 is a schematic diagram illustrating a Java bytecode injection method, according to some example embodiments of this specification. The method is applied to a Javaagent framework deployed in a Java virtual machine. As shown in FIG. 3, the Javaagent framework is connected to at least one service module that has a code injection need. A globally unique class transformer is registered with the Java virtual machine, and the Java virtual machine further maintains mapping relationships between injection point types and injection modes that correspond to implementation classes included in the at least one service module.

In an illustrated implementation, the Javaagent framework defines an SPI interface for the at least one service module.

Further, the at least one service module can be obtained by invoking the SPI interface, and the obtained at least one service module can be loaded into the Javaagent framework to complete connection of the at least one service module.

For example, in an example of FIG. 1, a service module that needs to be connected can be discovered by invoking the SPI interface, so as to obtain at least one service module, and the at least one obtained service module can be loaded into the Javaagent framework to complete connection of the at least one service module.

In the embodiments, a to-be-injected Java bytecode that is submitted by any target service module in the at least one service module can be obtained, and a target implementation class corresponding to the to-be-injected Java bytecode can be determined.

For example, in an example of FIG. 3, after loading in S301 is completed, for the at least one service module connected to the Javaagent framework, a to-be-injected bytecode submitted by any target service module can be obtained, and a target implementation class corresponding to the to-be-injected Java bytecode can be determined.

In addition, the to-be-injected bytecode can also be a target implementation class.

In the embodiments, a target injection point type corresponding to the target implementation class can be determined, and the target injection point type can be individually matched with the maintained mapping relationships to determine a target injection mode corresponding to the target injection point type.

It is worthwhile to note that, the class transformer needs to replace a corresponding class in a class file corresponding to the target service module based on the target implementation class. Therefore, to implement injection for the target implementation class, the target injection mode needs to be determined. It can be seen from the descriptions above that, an injection method based on multiple class transformers consumes an excessively long time. Therefore, in this specification, the target injection mode can be determined by using the mapping relationships summarized and maintained by the Java virtual machine, so as to shorten a time consumed by class transformation.

For example, in an example of FIG. 3, after the target implementation class corresponding to the to-be-injected Java bytecode is determined, a target injection point type corresponding to the target implementation class can be determined, and the target injection point type can be individually matched with the maintained mapping relationships to determine a target injection mode corresponding to the target injection point type.

It is worthwhile to note that, the above-mentioned mapping relationships can exist in a form of a set.

In an illustrated implementation, the Java virtual machine maintains a mapping relationship set respectively corresponding to the at least one service module; and the mapping relationship set includes the mapping relationships between injection point types and injection modes that respectively correspond to the implementation classes included in the at least one service module.

Further, in response to that any service module is connected to the Javaagent framework, structural parsing can be individually performed on an implementation class included in the service module, and an injection point type corresponding to the implementation class can be determined based on a result of the structural parsing, and an injection mode corresponding to the implementation class can be determined based on the injection point type; and a mapping relationship between the injection point type and the injection mode that correspond to the implementation class can be established, and the established mapping relationship can be saved to a mapping relationship set corresponding to the service module.

For example, in FIG. 3, the Java virtual machine can maintain not only mapping relationships between injection point types and injection modes that correspond to implementation classes included in the at least one service module, but also a mapping relationship set respectively corresponding to the at least one service module. The mapping relationship set can include the mapping relationships between injection point types and injection modes that correspond to the implementation classes included in the at least one service module.

In an example, each service module can include multiple implementation classes, and each implementation class has a corresponding mapping relationship between an injection point type and an injection mode. As such, multiple mapping relationships corresponding to each service module can form the above-mentioned mapping relationship set. In other words, the mapping relationship set can include not only multiple different mapping relationships corresponding to the same service module, but also multiple different mapping relationships respectively corresponding to multiple different service modules.

Next, a construction process of the above-mentioned mapping relationship set is described by using FIG. 3 as an example. As shown in FIG. 3, the construction process includes the following steps.

S301: Load a service module.

S302: Activate the service module.

By loading and activating the service module, the service module can be connected to the Javaagent framework.

S303: In response to that any service module is connected to the Javaagent framework, perform structural parsing individually on an implementation class included in the service module, and determine an injection point type corresponding to the implementation class based on a result of the structural parsing.

In an example, after the service module is connected to the Javaagent framework, structural parsing can be individually performed on each implementation class included in the service module to determine, based on a result of the structural parsing, an injection point type corresponding to each implementation class.

S304: Determine an injection mode corresponding to the implementation class based on the injection point type.

It is worthwhile to note that, as a mapping relationship between the injection point type and the injection mode has not been constructed at this time, judgment needs to be performed based on the injection point type to determine the injection mode corresponding to the implementation class.

In an illustrated implementation, the injection point types include an interface-based injection type and a class-based injection type; and the injection modes include precise injection and fuzzy injection.

The fuzzy injection refers to a mode that a code is injected for all implementation classes included in an interface that inherits the implementation class. The precise injection refers to a mode that a code is injected for the implementation class based on class name information corresponding to the implementation class.

Further, when structural parsing is individually performed on the implementation class included in the service module, and the injection point type corresponding to the implementation class is determined based on the result of the structural parsing in S303, it can be determined, based on the result of the structural parsing, whether the implementation class is a superclass inherited by another interface; and in response to that the implementation class is a superclass inherited by another interface, it is determined that the injection point type corresponding to the implementation class is the interface-based injection type; or in response to that the implementation class is not a superclass inherited by another interface, it is determined that the injection point type corresponding to the implementation class is the class-based injection type.

For example, structural parsing can be performed based on the implementation class, and a family member of the class, such as a parent class or an interface, can be obtained based on the implementation class, so as to determine whether the implementation class is a superclass inherited by another interface.

In an example, when the implementation class is a superclass inherited by another class, if the another class is inherited by another interface, it can be determined that the implementation class is a superclass inherited by the another interface, and it can be determined that the injection point type corresponding to the implementation class is the interface-based injection type.

In another example, when the implementation class has no parent class, it can be determined that the implementation class is not a superclass inherited by another interface, and it can be determined that the injection point type corresponding to the implementation class is the class-based injection type.

Further, when the injection mode corresponding to the implementation class is determined based on the injection point type in S304, if the injection point type is the interface-based injection type, it is determined that the injection mode corresponding to the implementation class is the fuzzy injection; or if the injection point type is the class-based injection type, it is determined that the injection mode corresponding to the implementation class is the precise injection.

For example, after parsing is performed, the corresponding injection mode can be determined based on the injection point type. When the injection point type is the interface-based injection type, because injection needs to be performed for methods in all implementation classes in an interface, the corresponding injection mode is the fuzzy injection, and a code is injected for all implementation classes included in an interface that inherits the implementation class. When the injection point type is the class-based injection type, because an implementation class corresponding to injection is clarified, the corresponding injection mode is the precise injection, and a code is injected based on the class name information corresponding to the implementation class.

S305: Establish a mapping relationship between the injection point type and the injection mode that correspond to the implementation class.

After an injection point type and an injection mode that correspond to each implementation class in a service module are determined, a mapping relationship between the injection point type and the injection mode can be established for each implementation class in each service module.

For example, after it is determined that the injection point type corresponding to the implementation class in the service module is the interface-based injection type, and the corresponding injection mode is the fuzzy injection, a mapping relationship corresponding to the implementation class can be established, which is between the interface-based injection type and the fuzzy injection.

S306: Save the established mapping relationship to a mapping relationship set corresponding to the service module.

According to the above-mentioned preprocessing on the service module, injection point parsing is performed to determine the injection point type and the injection mode is determined by using an injection point decision. A mapping relationship set corresponding to each service module can be constructed. As such, when class transformation is performed, an injection mode can be directly determined based on a mapping relationship, and the class transformer no longer needs to decide how to perform injection, thereby shortening a time consumed by class transformation and improving matching efficiency of class transformation.

It is worthwhile to note that, the mapping relationships maintained in the Java virtual machine can be matched by Javaagent, or can be maintained by constructing a matcher that performs a corresponding matching action.

In an illustrated implementation, a matcher group corresponding to the class transformer is registered with the Java virtual machine; the matcher group includes a matcher respectively corresponding to the at least one service module; and a matcher corresponding to any service module is configured to maintain a mapping relationship set corresponding to the service module, and perform a matching action related to maintaining the mapping relationship set.

For example, when S305 is performed, a matcher corresponding to an implementation class of a service module can be generated, and the matcher maintains a mapping relationship between an injection point type and an injection mode that correspond to the implementation class. When S306 is performed, the generated matcher can be added to the matcher group (i.e., GroupMatcher) that corresponds to the class transformer and that is registered with the Java virtual machine. The matcher group includes multiple matchers.

Further, when step 202 is performed, a matcher can be used for implementation. A matcher corresponding to the target service module in the matcher group is invoked, so that the matcher performs a matching action of matching the target injection point type with a mapping relationship in a mapping relationship set maintained by the matcher, so as to determine the target injection mode corresponding to the target injection point type.

For example, the matcher corresponding to the target service module in the matcher group registered with the Java virtual machine can be invoked to perform the matching action, so that the matcher determines, based on the mapping relationship set (maintained by the matcher) of mapping relationships between injection point types and injection modes, the target injection mode that matches the target injection point type.

In the embodiments, after the target injection mode corresponding to the target injection point type is matched by using the above-mentioned mapping relationship, the globally unique class transformer can be invoked, so that the class transformer injects, based on the target injection mode, the Java bytecode into the class file that corresponds to the target service module and that is to be loaded by the Java virtual machine.

For example, the globally unique class transformer is invoked, so that the class transformer can perform injection based on the target injection mode to inject the Java bytecode into the class file that corresponds to the target service module and that is to be loaded by the Java virtual machine, so as to achieve a purpose of bytecode modification.

Next, the above-mentioned processes of mapping relationship matching and bytecode injection are described by using FIG. 3 as an example. As shown in FIG. 3, the following steps are included.

S307: Determine a target injection point type corresponding to the target implementation class.

In an illustrated implementation, structural parsing can be performed on the target implementation class, and the injection point type corresponding to the target implementation class can be determined based on a result of the structural parsing.

For example, structural parsing can be performed on the target implementation class, and then the injection point type corresponding to the target implementation class can be determined based on the result of the structural parsing.

In an illustrated implementation, when the injection point type corresponding to the target implementation class is determined based on the result of the structural parsing in S307, it can be determined, based on the result of the structural parsing, whether the target implementation class is a superclass inherited by another interface; and in response to that the target implementation class is a superclass inherited by another interface, it is determined that the injection point type corresponding to the target implementation class is the interface-based injection type; or in response to that the target implementation class is not a superclass inherited by another interface, it is determined that the injection point type corresponding to the target implementation class is the class-based injection type.

For example, structural parsing can be performed based on the target implementation class, and a family member of the class, such as a parent class or an interface, can be obtained based on the target implementation class, so as to determine whether the target implementation class is a superclass inherited by another interface.

In an example, when the target implementation class is a superclass inherited by another class, if the another class is inherited by another interface, it can be determined that the target implementation class is a superclass inherited by the another interface, and it can be determined that the injection point type corresponding to the target implementation class is the interface-based injection type.

In another example, when the target implementation class has no parent class, it can be determined that the target implementation class is not a superclass inherited by another interface, and it can be determined that the injection point type corresponding to the target implementation class is the class-based injection type.

S308: Individually match the target injection point type with the maintained mapping relationships to determine a target injection mode corresponding to the target injection point type.

For example, after the target injection point type is determined, each mapping relationship in the mapping relationship set maintained in the matcher corresponding to the target service module in the matcher group can be invoked to perform matching to determine the target injection mode corresponding to the target injection point type.

S309: The class transformer injects, based on the target injection mode, the Java bytecode into a class file that corresponds to the target service module and that is to be loaded by the Java virtual machine.

In an illustrated implementation, if the target injection mode is the precise injection, it is determined, based on class name information of the target implementation class, whether the class file that corresponds to the target service module and that is to be loaded by the Java virtual machine is a class file adaptive to the target implementation class; and in response to that the class file that corresponds to the target service module and that is to be loaded by the Java virtual machine is a class file adaptive to the target implementation class, the Java bytecode is injected into the class file, where the precise injection refers to a mode that a code is injected for the implementation class based on class name information corresponding to the implementation class.

In addition, if the target injection mode is the fuzzy injection, structural parsing is performed on the class file that corresponds to the target service module and that is to be loaded by the Java virtual machine to obtain at least one implementation class to be loaded that is included in the class file; and it is determined, from the at least one implementation class to be loaded, an implementation class included in a target interface, and the Java bytecode is injected into the implementation class included in the target interface, where the target interface is an interface that inherits the target implementation class; and the fuzzy injection refers to a mode that a code is injected for all implementation classes included in an interface that inherits the implementation class.

For example, the above-mentioned target injection modes can include the precise injection and the fuzzy injection. The precise injection refers to a mode that a code is injected for the implementation class based on class name information corresponding to the implementation class. The fuzzy injection refers to a mode that a code is injected for all implementation classes included in an interface that inherits the implementation class.

In an example, when the target injection mode is the precise injection, it can be determined, based on the class name information of the target implementation class, whether the class file that corresponds to the target service module and that is to be loaded by the Java virtual machine is a class file adaptive to the target implementation class. In response to that the class file that corresponds to the target service module and that is to be loaded by the Java virtual machine is a class file adaptive to the target implementation class, the Java bytecode is injected into the class file.

For example, when a service module defines a method in a target implementation class to be modified, and an injection point type is the class-based injection type, a corresponding injection mode is the precise injection. In this case, based on class name information of the target implementation class, matching can be performed by using a class name included in the class file that corresponds to the target service module and that is to be loaded by the Java virtual machine, to determine a class file adaptive to the target implementation class and modify a class that has the same class name information in the class file.

In another example, when the target injection mode is the fuzzy injection, structural parsing can be performed on the class file that corresponds to the target service module and that is to be loaded by the Java virtual machine to obtain at least one implementation class to be loaded that is included in the class file; and it can be determined, from the at least one implementation class to be loaded, an implementation class included in a target interface, and the Java bytecode can be injected into the implementation class included in the target interface, where the target interface is an interface that inherits the target implementation class.

For example, when an injection point defined by a service module is specific to a method in an interface that inherits a target implementation class, an injection point type is the interface-based injection type, and a corresponding injection mode is the fuzzy injection. In this case, structural parsing can be performed on the class file that corresponds to the target service module and that is to be loaded by the Java virtual machine to obtain family information of a class in the class file and obtain at least one implementation class to be loaded that is included in the class file; and then, an interface that inherits the target implementation class is determined as a target interface, and a method in an implementation class included in the target interface is modified.

It is worthwhile to note that, when an underlying injection framework in a related technology is used in a wide range of production environments, stability guarantee for the underlying injection framework is lacked, and a risk management and control capability is lacked. The underlying injection framework is limited only to an objective of solving a problem of a specific field in only one architecture domain.

Therefore, to improve a monitoring capability and reduce a stability risk during use in a wide range of production environments, stability guarantee can be implemented by constructing an injection runtime-based indicator monitoring capability and a service degradation processing capability in the Javaagent framework.

In an illustrated implementation, monitoring indicator data related to code injection performed by the class transformer for the class file to be loaded can be collected, where the monitoring indicator data indicate service performance of a code injection service provided by the class transformer for the at least one service module.

In addition, it is determined, based on the collected monitoring indicator data, whether service degradation processing is to be performed for the code injection service; and in response to that service degradation processing is to be performed for the code injection service, service degradation processing is performed for the code injection service. The service degradation processing includes performing overall service degradation processing for code injection services provided for all service modules; or performing partial service degradation processing for a code injection service provided for the at least one service module.

Figure 4:
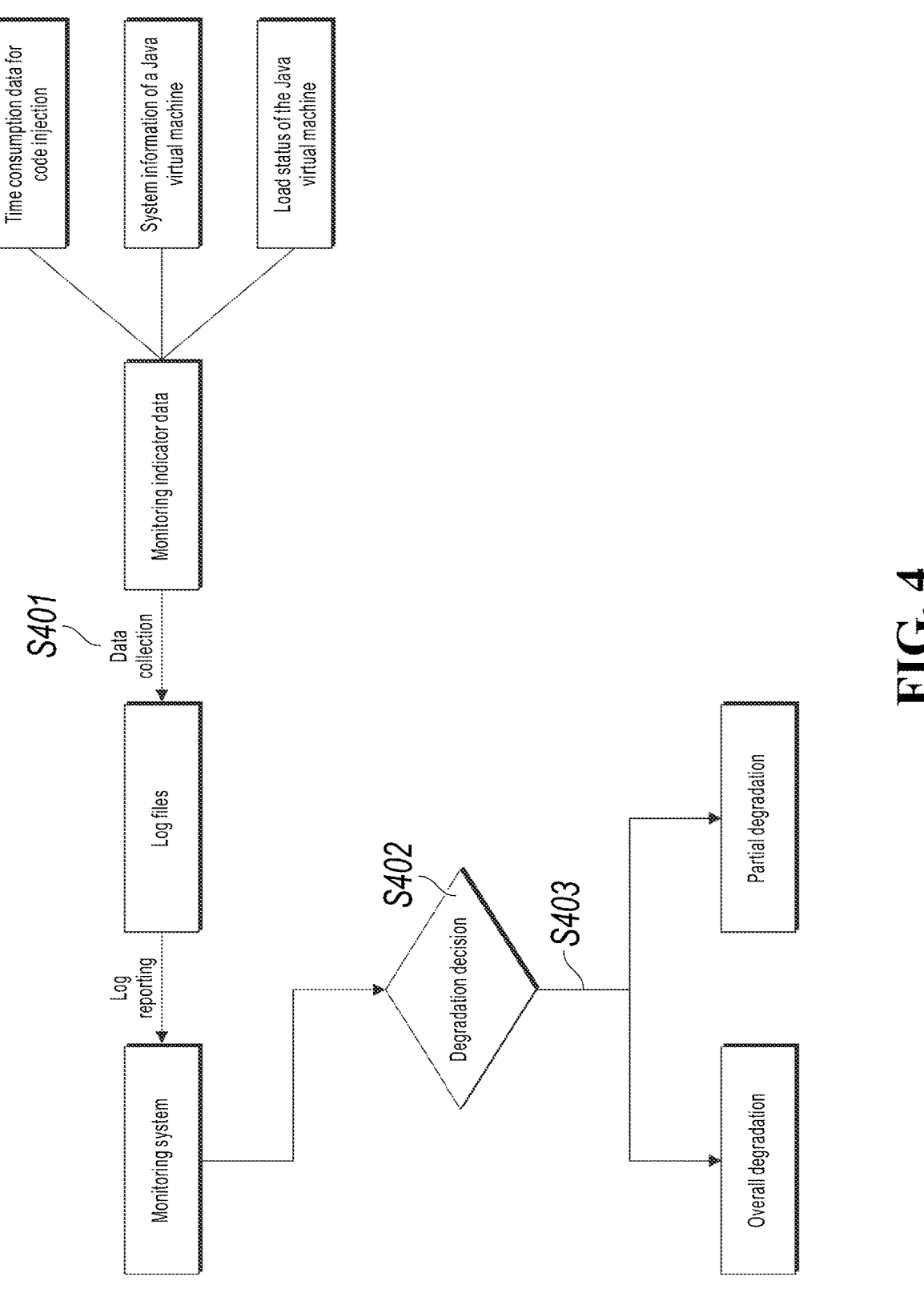
FIG. 4 is a schematic diagram illustrating stability guarantee, according to some example embodiments of this specification.

With reference to FIG. 4, the following describes in detail stability guarantee applied to the Javaagent framework in FIG. 1 in this specification.

FIG. 4 is a schematic diagram illustrating stability guarantee, according to some example embodiments of this specification. As shown in FIG. 4, the following execution steps can be included.

S401: Collect monitoring indicator data related to code injection performed by the class transformer for the class file to be loaded. The monitoring indicator data indicate service performance of a code injection service provided by the class transformer for the at least one service module.

In an illustrated implementation, the monitoring indicator data include one or a combination of multiple of the following: time consumption data for the code injection, system information of the Java virtual machine, and a load status of the Java virtual machine.

For example, the monitoring indicator data can be time consumption data for the code injection, for example, an average time consumed by injection, a time consumed by injection of different bytecodes, etc. The system information of the Java virtual machine can be occupation statuses of a processor and a memory. The load status of the Java virtual machine can be a current load of the virtual machine.

S402: Determine, based on the collected monitoring indicator data, whether service degradation processing is to be performed for the code injection service.

As shown in FIG. 4, the collected monitoring indicator data can be reported to a monitoring system in a form of logs. The monitoring system makes a degradation decision based on the collected monitoring indicator data to determine whether service degradation processing is to be performed for the code injection service.

The service degradation processing can be stopping executing logic corresponding to the code injection service, or skipping a part of the logic. This specification sets no limitation thereto.

S403: In response to that service degradation processing is to be performed for the code injection service, perform service degradation processing for the code injection service.

When service degradation processing is performed for the code injection service, overall service degradation processing can be performed for code injection services provided for all service modules; or partial service degradation processing can be performed for a code injection service provided for the at least one service module.

For example, when service degradation processing is performed for the code injection service, overall service degradation processing can be performed for the code injection services provided for all the service modules, i.e., degradation can be performed in the entire framework. Or, service degradation processing can be first performed for a code injection service provided by a low-priority service module based on priorities of different service modules. If degradation processing still needs to be performed, service degradation processing is performed for a code injection service provided by a higher-priority service module.

According to the above-mentioned technical solutions, a globally unique class transformer is constructed, and mapping relationships between injection point types and injection modes that correspond to implementation classes included in a service module are constructed. When a bytecode submitted by the service module is to be injected, an injection mode can be determined based on the mapping relationships. Such practice avoids creating a new class transformer each time a bytecode is injected, and there is no need to match or weave multiple class transformers, thereby shortening a time consumed by class transformation and improving matching efficiency of class transformation.

In some example embodiments of this specification, a device capable of implementing the above-mentioned method is further provided.

Figure 5:
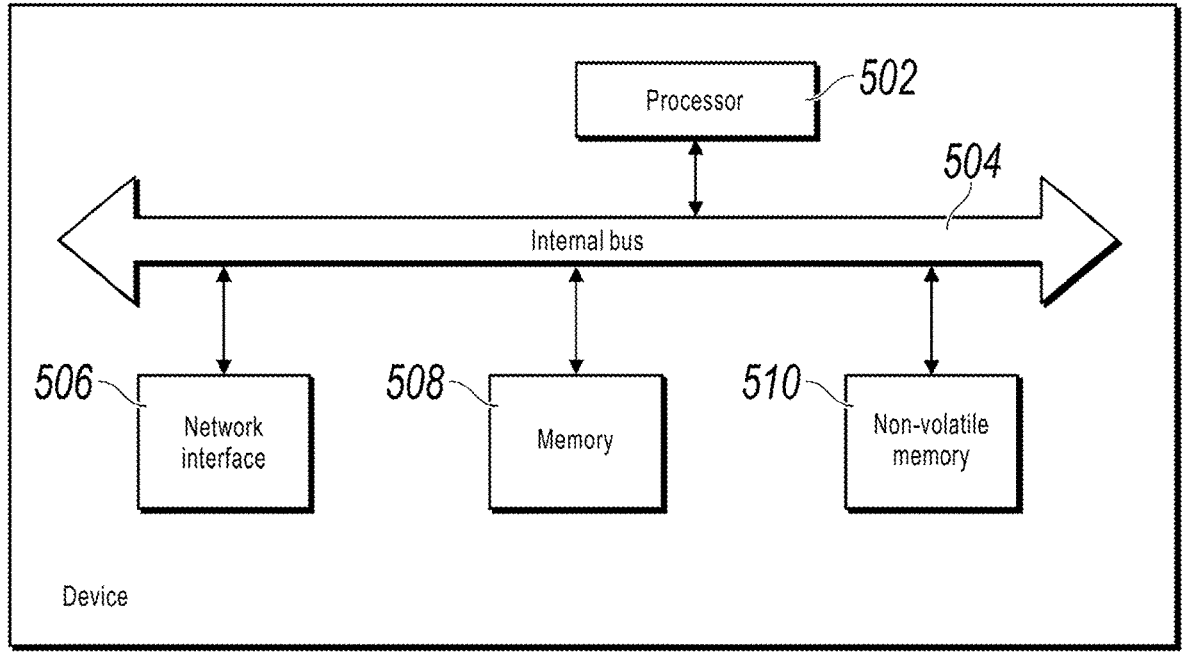
FIG. 5 is a schematic structural diagram illustrating an electronic device that houses a Java bytecode injection apparatus, according to some example embodiments of this specification.

FIG. 5 is a schematic structural diagram illustrating a device, according to some example embodiments. Referring to FIG. 5, in terms of hardware, the device includes a processor 502, an internal bus 504, a network interface 506, a memory 508, and a non-volatile memory 510, and certainly may further include hardware needed by other services. One or more embodiments of this specification can be implemented in a software-based way, for example, the processor 502 reads a corresponding computer program from the non-volatile memory 510 to the memory 509, and then runs the computer program. Certainly, in addition to a software implementation, one or more embodiments of this specification do not exclude another implementation, for example, a logic device or a combination of hardware and software. That is, an execution body of the following processing procedure is not limited to each logical unit, and can also be hardware or a logic device.

Figure 6:
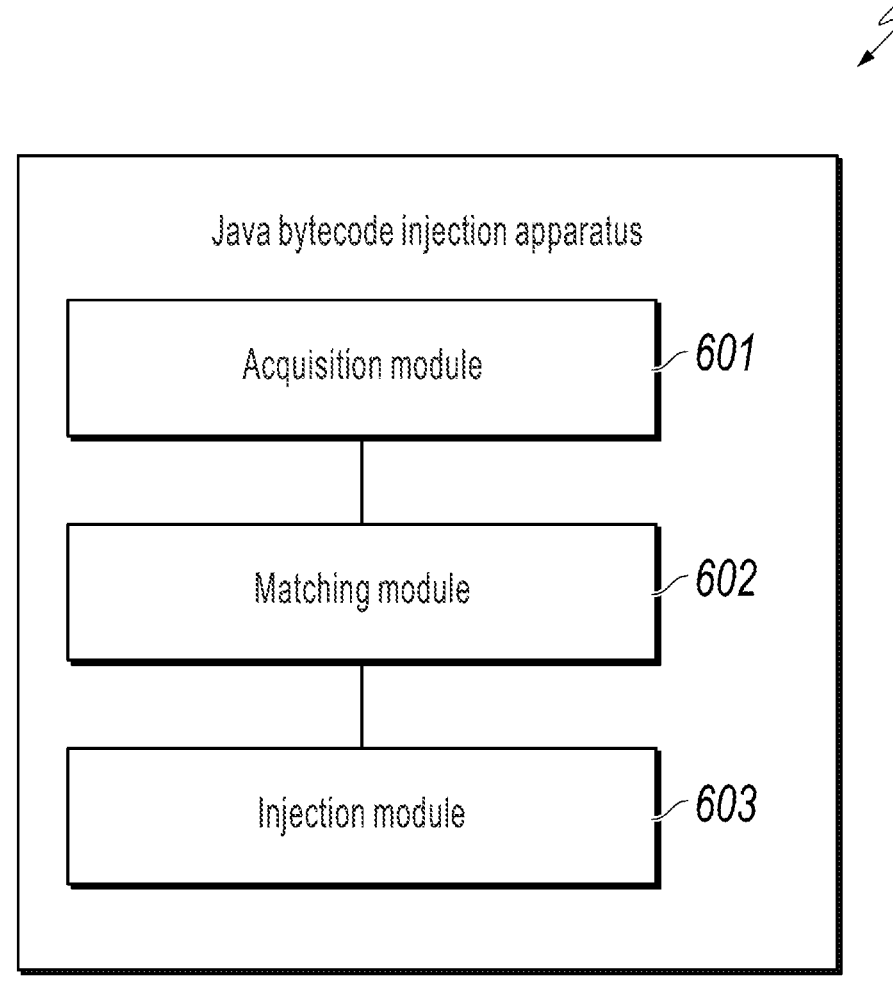
FIG. 6 is a block diagram illustrating a Java bytecode injection apparatus, according to some example embodiments of this specification.

Referring to FIG. 6, in a software implementation, a Java bytecode injection apparatus 600 is provided, and is applied to a Javaagent framework deployed in a Java virtual machine. As shown in FIG. 6, the apparatus 600 includes the following: an acquisition module 601, configured to obtain a to-be-injected Java bytecode that is submitted by any target service module in the at least one service module, and determine a target implementation class corresponding to the to-be-injected Java bytecode; a matching module 602, configured to determine a target injection point type corresponding to the target implementation class, and individually match the target injection point type with the maintained mapping relationships to determine a target injection mode corresponding to the target injection point type; and an injection module 603, configured to invoke the globally unique class transformer so that the class transformer injects, based on the target injection mode, the Java bytecode into a class file that corresponds to the target service module and that is to be loaded by the Java virtual machine.

Optionally, the Javaagent framework defines an SPI interface for the at least one service module.

Further, the apparatus 600 further includes the following: a load module 604 (not shown in the figure), configured to obtain the at least one service module by invoking the SPI interface, and load the obtained at least one service module into the Javaagent framework to complete connection of the at least one service module.

Optionally, the Java virtual machine maintains a mapping relationship set respectively corresponding to the at least one service module; and the mapping relationship set includes mapping relationships between injection point types and injection modes that respectively correspond to implementation classes included in the at least one service module.

Further, the apparatus 600 further includes the following: a parsing module 605 (not shown in the figure), configured to, in response to that any service module is connected to the Javaagent framework, perform structural parsing individually on an implementation class included in the service module, and determine an injection point type corresponding to the implementation class based on a result of the structural parsing, and determine an injection mode corresponding to the implementation class based on the injection point type; and a mapping module 606 (not shown in the figure), configured to establish a mapping relationship between the injection point type and the injection mode that correspond to the implementation class, and save the established mapping relationship to a mapping relationship set corresponding to the service module.

Optionally, a matcher group corresponding to the class transformer is registered with the Java virtual machine; the matcher group includes a matcher respectively corresponding to the at least one service module; and a matcher corresponding to any service module is configured to maintain a mapping relationship set corresponding to the service module, and perform a matching action related to maintaining the mapping relationship set.

The parsing module 605 is further configured to invoke a matcher corresponding to the target service module in the matcher group so that the matcher performs a matching action of matching the target injection point type with a mapping relationship in a mapping relationship set maintained by the matcher to determine the target injection mode corresponding to the target injection point type.

Optionally, the injection point types include an interface-based injection type and a class-based injection type; and the injection modes include precise injection and fuzzy injection.

The parsing module 605 is further configured to determine, based on the result of the structural parsing, whether the implementation class is a superclass inherited by another interface; and in response to that the implementation class is a superclass inherited by another interface, determine that the injection point type corresponding to the implementation class is the interface-based injection type; or in response to that the implementation class is not a superclass inherited by another interface, determine that the injection point type corresponding to the implementation class is the class-based injection type.

In addition, the parsing module 605 is further configured to, if the injection point type is the interface-based injection type, determine that the injection mode corresponding to the implementation class is the fuzzy injection, where the fuzzy injection refers to a mode that a code is injected for all implementation classes included in an interface that inherits the implementation class; or if the injection point type is the class-based injection type, determine that the injection mode corresponding to the implementation class is the precise injection, where the precise injection refers to a mode that a code is injected for the implementation class based on class name information corresponding to the implementation class.

Optionally, the acquisition module 601 is further configured to perform structural parsing on the target implementation class, and determine the injection point type corresponding to the target implementation class based on a result of the structural parsing.

Optionally, the acquisition module 601 is further configured to determine, based on the result of the structural parsing, whether the target implementation class is a superclass inherited by another interface; and in response to that the target implementation class is a superclass inherited by another interface, determine that the injection point type corresponding to the target implementation class is the interface-based injection type; or in response to that the target implementation class is not a superclass inherited by another interface, determine that the injection point type corresponding to the target implementation class is the class-based injection type.

Optionally, the injection module 603 is further configured to, if the target injection mode is the precise injection, determine, based on class name information of the target implementation class, whether the class file that corresponds to the target service module and that is to be loaded by the Java virtual machine is a class file adaptive to the target implementation class; and in response to that the class file that corresponds to the target service module and that is to be loaded by the Java virtual machine is a class file adaptive to the target implementation class, inject the Java bytecode into the class file, where the precise injection refers to a mode that a code is injected for the implementation class based on class name information corresponding to the implementation class; or if the target injection mode is the fuzzy injection, perform structural parsing on the class file that corresponds to the target service module and that is to be loaded by the Java virtual machine to obtain at least one implementation class to be loaded that is included in the class file; and determine, from the at least one implementation class to be loaded, an implementation class included in a target interface, and inject the Java bytecode into the implementation class included in the target interface, where the target interface is an interface that inherits the target implementation class; and the fuzzy injection refers to a mode that a code is injected for all implementation classes included in an interface that inherits the implementation class.

Optionally, the apparatus 600 further includes the following: a collection module 607 (not shown in the figure), configured to collect monitoring indicator data related to code injection performed by the class transformer for the class file to be loaded, where the monitoring indicator data indicate service performance of a code injection service provided by the class transformer for the at least one service module; and a degradation module 608 (not shown in the figure), configured to determine, based on the collected monitoring indicator data, whether service degradation processing is to be performed for the code injection service; and in response to that service degradation processing is to be performed for the code injection service, perform service degradation processing for the code injection service; where the service degradation processing includes performing overall service degradation processing for code injection services provided for all service modules; or performing partial service degradation processing for a code injection service provided for the at least one service module.

Optionally, the monitoring indicator data include one or a combination of multiple of the following: time consumption data for the code injection, system information of the Java virtual machine, and a load status of the Java virtual machine.

For detailed implementation processes of functions and roles of the modules in the apparatus 600, references can be made to the implementation processes of corresponding steps in the previously described Java bytecode injection method. For related parts, references can be made to some descriptions in the method implementation. Details are omitted here for simplicity.

The described apparatus implementation is merely an example. The units described as separate parts can or do not have to be physically separate, and parts displayed as units can or do not have to be physical modules, that is, can be located in one position, or can be distributed on a plurality of network modules. Some or all of the units or modules can be selected based on actual needs to achieve the objectives of the solutions of this specification. A person of ordinary skill in the art can understand and implement the embodiments without creative efforts.

The systems, apparatuses, modules, or units illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an e-mail sending and receiving device, a game console, a tablet computer, a wearable device, or any combination of several of these devices.

In a typical configuration, the computer includes one or more processors (CPUs), one or more input/output interfaces, one or more network interfaces, and one or more memories.

The memory may include a non-persistent memory, a random access memory (RAM), and/or a non-volatile memory in a computer-readable medium, for example, a read-only memory (ROM) or a flash read-only memory (flash RAM). The memory is an example of the computer-readable medium.

The computer-readable medium includes persistent and non-persistent media and removable and non-removable media, which can implement information storage by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a disk memory, a quantum memory, a graphene-based storage medium, another magnetic storage device, or any other non-transmission medium. The computer storage medium can be configured to store information that can be accessed by a computing device. As described in this specification, the computer-readable medium does not include computer-readable transitory media (transitory media) such as a modulated data signal and a carrier.

It is worthwhile to further note that, the terms "include", "comprise", or any other variant thereof are intended to cover a non-exclusive inclusion such that a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

Specific embodiments of this specification are described above. Other embodiments fall within the scope of the appended claims. In some situations, the actions or steps described in the claims can be performed in an order different from the order in the embodiments and the desired results can still be achieved. In addition, processes described in the accompanying drawings do not necessarily need a specific order or a sequential order shown to achieve the desired results. In some implementations, multi-tasking and parallel processing are also possible or may be advantageous.

The terms used in one or more embodiments of this specification are merely used for an objective of describing a specific embodiment, and is not intended to limit one or more embodiments of this specification. The terms "a", "said", and "the" of singular forms used in one or more embodiments and the appended claims of this specification are also intended to include plural forms, unless otherwise specified in the context clearly. It should also be understood that the term "and/or" used here refers to and includes any or all possible combinations of one or more associated listed items.

It should be understood that, although the terms "first", "second", "third", etc. may be used in one or more embodiments of this specification to describe various information, the information should not be limited to these terms. These terms are only used to distinguish the same type of information from each other. For example, without departing from the scope of one or more embodiments of this specification, "first information" can also be referred to as "second information", and similarly, "second information" can also be referred to as "first information". Depending on the context, for example, the term "if" used here can be interpreted as "in a case that . . . ", "when . . . ", or "in response to determining".

The above-mentioned descriptions are merely example embodiments of one or more embodiments of this specification, and are not intended to limit one or more embodiments of this specification. Any modification, equivalent replacement, or improvement made in the spirit and principle of one or more embodiments of this specification shall fall within the claimed protection scope of one or more embodiments of this specification.

The invention claimed is:

1. A computer-implemented method for Java bytecode injection, comprising:

obtaining, by a Javaagent framework deployed in a Java virtual machine, a to-be-injected Java bytecode that is submitted by a target service module in at least one service module, wherein a globally unique class transformer is registered with the Java virtual machine, and the Java virtual machine further maintains mapping relationships between injection point types and injection modes that correspond to implementation classes comprised in the at least one service module;

determining a target implementation class corresponding to the to-be-injected Java bytecode;

determining a target injection point type corresponding to the target implementation class;

respectively matching the target injection point type with the mapping relationships to determine a target injection mode corresponding to the target injection point type; and invoking the globally unique class transformer so that the globally unique class transformer injects, based on the target injection mode, the to-be-injected Java bytecode into a class file that corresponds to the target service module and that is to be loaded by the Java virtual machine.

2. The computer-implemented method according to claim 1, wherein the Javaagent framework defines a service provider interface (SPI) interface for the at least one service module; and the computer-implemented method further comprises:

obtaining the at least one service module by invoking the SPI interface; and loading the at least one service module into the Javaagent framework to complete connection of the at least one service module.

3. The computer-implemented method according to claim 1, wherein:

the Java virtual machine maintains a mapping relationship set respectively corresponding to the at least one service module;

the mapping relationship set comprises the mapping relationships between injection point types and injection modes that respectively correspond to the implementation classes comprised in the at least one service module; and the computer-implemented method further comprises:

in response to that any service module is connected to the Javaagent framework, performing structural parsing individually on an implementation class comprised in the service module, determining an injection point type corresponding to the implementation class based on a result of the structural parsing, determining an injection mode corresponding to the implementation class based on the injection point type; and establishing a mapping relationship between the injection point type and the injection mode that correspond to the implementation class, saving the mapping relationship to a mapping relationship set corresponding to the service module.

4. The computer-implemented method according to claim 3, wherein:

a matcher group corresponding to the globally unique class transformer is registered with the Java virtual machine, the matcher group comprises a matcher respectively corresponding to the at least one service module;

a matcher corresponding to a service module is configured to:

maintain a mapping relationship set corresponding to the service module; and perform a matching action related to maintaining the mapping relationship set; and the respectively matching the target injection point type with the mapping relationships to determine a target injection mode corresponding to the target injection point type comprises:

invoking a matcher corresponding to the target service module in the matcher group so that the matcher performs a matching action of matching the target injection point type with a mapping relationship in a mapping relationship set maintained by the matcher to determine the target injection mode corresponding to the target injection point type.

5. The computer-implemented method according to claim 3, wherein the injection point types comprise an interface-based injection type and a class-based injection type; and the injection modes comprise precise injection and fuzzy injection;

the determining an injection point type corresponding to the implementation class based on a result of the structural parsing comprises:

determining, based on the result of the structural parsing, whether the implementation class is a superclass inherited by another interface; and in response to that the implementation class is a superclass inherited by another interface, determining that the injection point type corresponding to the implementation class is the interface-based injection type; or in response to that the implementation class is not a superclass inherited by another interface, determining that the injection point type corresponding to the implementation class is the class-based injection type; and the determining an injection mode corresponding to the implementation class based on the injection point type comprises:

if the injection point type is the interface-based injection type, determining that the injection mode corresponding to the implementation class is the fuzzy injection, wherein the fuzzy injection refers to a mode that a code is injected for all implementation classes comprised in an interface that inherits the implementation class; or if the injection point type is the class-based injection type, determining that the injection mode corresponding to the implementation class is the precise injection, wherein the precise injection refers to a mode that a code is injected for the implementation class based on class name information corresponding to the implementation class.

6. The computer-implemented method according to claim 1, wherein the determining a target injection point type corresponding to the target implementation class comprises:

performing structural parsing on the target implementation class; and determining the injection point type corresponding to the target implementation class based on a result of the structural parsing.

7. The computer-implemented method according to claim 6, wherein the determining the injection point type corresponding to the target implementation class based on a result of the structural parsing comprises:

determining, based on the result of the structural parsing, whether the target implementation class is a superclass inherited by another interface; and in response to that the target implementation class is a superclass inherited by another interface, determining that the injection point type corresponding to the target implementation class is an interface-based injection type; or in response to that the target implementation class is not a superclass inherited by another interface, determining that the injection point type corresponding to the target implementation class is a class-based injection type.

8. The computer-implemented method according to claim 6, wherein the injection modes comprise precise injection and fuzzy injection, and the globally unique class transformer injects, based on the target injection mode, the to-be-injected Java bytecode into a class file that corresponds to the target service module and that is to be loaded by the Java virtual machine by operations that comprise:

if the target injection mode is the precise injection, determining, based on class name information of the target implementation class, whether the class file that corresponds to the target service module and that is to be loaded by the Java virtual machine is a class file adaptive to the target implementation class; and in response to that the class file that corresponds to the target service module and that is to be loaded by the Java virtual machine is a class file adaptive to the target implementation class, injecting the to-be-injected Java bytecode into the class file, wherein the precise injection refers to a mode that a code is injected for a implementation class based on class name information corresponding to the implementation class; or if the target injection mode is the fuzzy injection, performing structural parsing on the class file that corresponds to the target service module and that is to be loaded by the Java virtual machine to obtain at least one implementation class to be loaded that is comprised in the class file; and determining, from the at least one implementation class to be loaded, an implementation class comprised in a target interface, and injecting the to-be-injected Java bytecode into the implementation class comprised in the target interface, wherein the target interface is an interface that inherits the target implementation class; and the fuzzy injection refers to a mode that a code is injected for all implementation classes comprised in an interface that inherits the implementation class.

9. The computer-implemented method according to claim 1, wherein the computer-implemented method further comprises:

collecting monitoring indicator data related to code injection performed by the globally unique class transformer for the class file to be loaded, wherein the monitoring indicator data indicate service performance of a code injection service provided by the globally unique class transformer for the at least one service module;

determining, based on the monitoring indicator data, whether service degradation processing is to be performed for the code injection service; and in response to that service degradation processing is to be performed for the code injection service, performing service degradation processing for the code injection service, wherein the service degradation processing comprises:

performing overall service degradation processing for code injection services provided for all service modules; or performing partial service degradation processing for a code injection service provided for the at least one service module.

10. The computer-implemented method according to claim 9, wherein the monitoring indicator data comprise one or a combination of:

time consumption data for the code injection, system information of the Java virtual machine, or a load status of the Java virtual machine.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a Javaagent framework deployed in a Java virtual machine, a to-be-injected Java bytecode that is submitted by a target service module in at least one service module, wherein a globally unique class transformer is registered with the Java virtual machine, and the Java virtual machine further maintains mapping relationships between injection point types and injection modes that correspond to implementation classes comprised in the at least one service module;

determining a target implementation class corresponding to the to-be-injected Java bytecode;

determining a target injection point type corresponding to the target implementation class;

respectively matching the target injection point type with the mapping relationships to determine a target injection mode corresponding to the target injection point type; and invoking the globally unique class transformer so that the globally unique class transformer injects, based on the target injection mode, the to-be-injected Java bytecode into a class file that corresponds to the target service module and that is to be loaded by the Java virtual machine.

12. The computer-implemented system according to claim 11, wherein the Javaagent framework defines a service provider interface (SPI) interface for the at least one service module; and the one or more operations further comprise:

obtaining the at least one service module by invoking the SPI interface; and loading the at least one service module into the Javaagent framework to complete connection of the at least one service module.

13. The computer-implemented system according to claim 11, wherein:

the Java virtual machine maintains a mapping relationship set respectively corresponding to the at least one service module;

the mapping relationship set comprises the mapping relationships between injection point types and injection modes that respectively correspond to the implementation classes comprised in the at least one service module; and the one or more operations further comprise:

in response to that any service module is connected to the Javaagent framework, performing structural parsing individually on an implementation class comprised in the service module, determining an injection point type corresponding to the implementation class based on a result of the structural parsing, determining an injection mode corresponding to the implementation class based on the injection point type; and establishing a mapping relationship between the injection point type and the injection mode that correspond to the implementation class, saving the mapping relationship to a mapping relationship set corresponding to the service module.

14. The computer-implemented system according to claim 13, wherein:

a matcher group corresponding to the globally unique class transformer is registered with the Java virtual machine, the matcher group comprises a matcher respectively corresponding to the at least one service module;

a matcher corresponding to a service module is configured to:

maintain a mapping relationship set corresponding to the service module; and perform a matching action related to maintaining the mapping relationship set; and the respectively matching the target injection point type with the mapping relationships to determine a target injection mode corresponding to the target injection point type comprises:

invoking a matcher corresponding to the target service module in the matcher group so that the matcher performs a matching action of matching the target injection point type with a mapping relationship in a mapping relationship set maintained by the matcher to determine the target injection mode corresponding to the target injection point type.

15. The computer-implemented system according to claim 13, wherein the injection point types comprise an interface-based injection type and a class-based injection type; and the injection modes comprise precise injection and fuzzy injection;

the determining an injection point type corresponding to the implementation class based on a result of the structural parsing comprises:

determining, based on the result of the structural parsing, whether the implementation class is a superclass inherited by another interface; and in response to that the implementation class is a superclass inherited by another interface, determining that the injection point type corresponding to the implementation class is the interface-based injection type; or in response to that the implementation class is not a superclass inherited by another interface, determining that the injection point type corresponding to the implementation class is the class-based injection type; and the determining an injection mode corresponding to the implementation class based on the injection point type comprises:

if the injection point type is the interface-based injection type, determining that the injection mode corresponding to the implementation class is the fuzzy injection, wherein the fuzzy injection refers to a mode that a code is injected for all implementation classes comprised in an interface that inherits the implementation class; or if the injection point type is the class-based injection type, determining that the injection mode corresponding to the implementation class is the precise injection, wherein the precise injection refers to a mode that a code is injected for the implementation class based on class name information corresponding to the implementation class.

16. The computer-implemented system according to claim 11, wherein the determining a target injection point type corresponding to the target implementation class comprises:

performing structural parsing on the target implementation class; and determining the injection point type corresponding to the target implementation class based on a result of the structural parsing.

17. The computer-implemented system according to claim 16, wherein the determining the injection point type corresponding to the target implementation class based on a result of the structural parsing comprises:

determining, based on the result of the structural parsing, whether the target implementation class is a superclass inherited by another interface; and in response to that the target implementation class is a superclass inherited by another interface, determining that the injection point type corresponding to the target implementation class is an interface-based injection type; or in response to that the target implementation class is not a superclass inherited by another interface, determining that the injection point type corresponding to the target implementation class is a class-based injection type.

18. The computer-implemented system according to claim 16, wherein the injection modes comprise precise injection and fuzzy injection, and the globally unique class transformer injects, based on the target injection mode, the to-be-injected Java bytecode into a class file that corresponds to the target service module and that is to be loaded by the Java virtual machine by operations that comprise:

if the target injection mode is the precise injection, determining, based on class name information of the target implementation class, whether the class file that corresponds to the target service module and that is to be loaded by the Java virtual machine is a class file adaptive to the target implementation class; and in response to that the class file that corresponds to the target service module and that is to be loaded by the Java virtual machine is a class file adaptive to the target implementation class, injecting the to-be-injected Java bytecode into the class file, wherein the precise injection refers to a mode that a code is injected for a implementation class based on class name information corresponding to the implementation class; or if the target injection mode is the fuzzy injection, performing structural parsing on the class file that corresponds to the target service module and that is to be loaded by the Java virtual machine to obtain at least one implementation class to be loaded that is comprised in the class file; and determining, from the at least one implementation class to be loaded, an implementation class comprised in a target interface, and injecting the to-be-injected Java bytecode into the implementation class comprised in the target interface, wherein the target interface is an interface that inherits the target implementation class; and the fuzzy injection refers to a mode that a code is injected for all implementation classes comprised in an interface that inherits the implementation class.

19. The computer-implemented system according to claim 11, wherein the one or more operations further comprise:

collecting monitoring indicator data related to code injection performed by the globally unique class transformer for the class file to be loaded, wherein the monitoring indicator data indicate service performance of a code injection service provided by the globally unique class transformer for the at least one service module;

determining, based on the monitoring indicator data, whether service degradation processing is to be performed for the code injection service; and in response to that service degradation processing is to be performed for the code injection service, performing service degradation processing for the code injection service, wherein the service degradation processing comprises:

performing overall service degradation processing for code injection services provided for all service modules; or performing partial service degradation processing for a code injection service provided for the at least one service module.

20. The computer-implemented system according to claim 19, wherein the monitoring indicator data comprise one or a combination of:

time consumption data for the code injection, system information of the Java virtual machine, or a load status of the Java virtual machine.

\*    \*    \*    \*    \*